(12) United States Patent
Suganuma et al.

(10) Patent No.: US 8,449,706 B2
(45) Date of Patent: May 28, 2013

(54) PROCESS FOR MANUFACTURING DEAERATING HOLLOW FIBER MODULE

(75) Inventors: Youhei Suganuma, Ichihara (JP); Misao Takeuchi, Kisarazu (JP); Shigeaki Fujieda, Funabashi (JP); Toshikazu Suganuma, Chiba (JP); Kouji Kawase, Tokyo (JP)

(73) Assignee: DIC Corporation, Tokyo (JP)

( * ) Notice: Subject to any disclaimer, the term of this patent is extended or adjusted under 35 U.S.C. 154(b) by 365 days.

(21) Appl. No.: 12/736,975

(22) PCT Filed: May 30, 2008

(86) PCT No.: PCT/JP2008/060020
§ 371 (c)(1),
(2), (4) Date: Nov. 29, 2010

(87) PCT Pub. No.: WO2009/144813
PCT Pub. Date: Dec. 3, 2009

(65) Prior Publication Data
US 2011/0146891 A1    Jun. 23, 2011

(51) Int. Cl.
*B32B 37/00*    (2006.01)
(52) U.S. Cl.
USPC ............................................ 156/184; 156/296
(58) Field of Classification Search
USPC .................... 156/184, 191, 194, 296
See application file for complete search history.

(56) References Cited

U.S. PATENT DOCUMENTS

| | | | |
|---|---|---|---|
| 4,210,536 A * | 7/1980 | Coplan et al. | 210/321.88 |
| 5,284,584 A | 2/1994 | Huang et al. | |
| 6,623,637 B1 * | 9/2003 | Monzen et al. | 210/321.74 |

FOREIGN PATENT DOCUMENTS

| | | |
|---|---|---|
| EP | 0970738 A1 | 1/2000 |
| JP | 52-099978 A | 8/1977 |
| JP | 61-015712 A | 1/1986 |
| JP | 63-236502 A | 10/1988 |
| JP | 02-107317 A | 4/1990 |
| JP | 05-017712 A | 1/1993 |
| JP | 05-245347 A | 9/1993 |
| JP | 05-245348 A | 9/1993 |
| JP | 07-088304 A | 4/1995 |
| JP | 10-298470 A | 11/1998 |
| JP | 2002-361050 A | 12/2002 |
| JP | 2005-305432 A | 11/2005 |
| WO | WO-98/28065 A1 | 7/1998 |
| WO | WO-03/041847 A1 | 5/2003 |
| WO | WO-2007/040036 A1 | 4/2007 |
| WO | WO-2007/116908 A1 | 10/2007 |

OTHER PUBLICATIONS

Supplementary European Search Report dated Jun. 1, 2012, issued for the European Patent Application No. 08777031.9.
Office Action mailed Nov. 9, 2012, issued for the Chinese patent application No. 200880129512.0 and English translation thereof.
International Search Report dated Jul. 1, 2008, issued for PCT/JP2008/060020.

* cited by examiner

*Primary Examiner* — Jeff Aftergut
(74) *Attorney, Agent, or Firm* — Edwards Wildman Palmer LLP

(57) ABSTRACT

A process for manufacturing a deaerating hollow fiber module with no core, including the steps of wrapping a sheet containing a multiplicity of hollow fibers around a temporary core; retaining in tubular form the sheet wrapped around the temporary core; and removing the temporary core from the sheet retained in tubular form.

2 Claims, 9 Drawing Sheets

VACUUM

PROCESS FOR MANUFACTURING DEAERATING HOLLOW FIBER MODULE

TECHNICAL FIELD

The present invention relates to a process for manufacturing a deaerating hollow fiber module used for deaerating in a diaphragm method that removes air or air bubbles and the like existing in a liquid, via a side wall (membrane) of a hollow fiber.

BACKGROUND ART

A deaerating hollow fiber module manufactured according to the present invention can be used for example for: deoxygenated water for boiler feed water; super deaerating such as deoxygenation, decarbonation, denitrification, and the like in an ultrapure water production stage in a semiconductor manufacturing process; deaerating of resist solution and developer in a lithography process; rusty water deaerating for buildings, condominiums and the like; deaerating of water for medical treatment; deaerating and defoaming of jet ink; and so forth.

Recently, with the even higher accuracy of ink jet printers, a deaerating hollow fiber module for deaerating and defoaming (removing bubbles in the ink) from a liquid such as jet ink is demanded. Regarding deaerating and defoaming of ink, for example Patent Documents 1 and 2 disclose a deaerating hollow fiber module of a so called internal perfusion type that deaerates by feeding ink to inside a hollow fiber and then reducing the pressure on the outside of the hollow fiber.

Furthermore, in general deaeration, for example in the following Patent Documents 3 and 4 and so forth, it is disclosed that a so called external perfusion type where a liquid is flowed in contact with the outside of a hollow fiber, and the pressure is reduced inside the hollow fiber, is superior in dissolved gas removal performance. In the case of the external perfusion type, while supplying ink containing bubbles to the deaerating hollow fiber module so that it touches with the outside of the hollow fiber, the inside of the hollow fiber is evacuated. The bubbles contained in the ink pass through the membrane due to the pressure difference between the inside and outside of the hollow fiber, and are removed to the low pressure side. The ink from which the bubbles have been removed, is discharged from the module without passing through the hollow fiber.

In the case of deaerating the jet ink, either of these methods may be used. However from the point of deaerating efficiency and pressure loss per unit membrane area, the external perfusion type is more preferably used compared to the internal perfusion type.

For the hollow fiber used in the present invention, the material, the membrane form, and the membrane structure are optional provided it is a membrane in hollow fiber form which passes gas but does not pass liquid, and a hollow fiber that is used in a conventional deaerating hollow fiber module can be used. Examples of the material for the hollow fiber include, a polyolefin resin such as polypropylene, poly (4-methylpentene-1), or the like, a silicon fiber resin such as polydimethylsiloxane, and a copolymer thereof, and a fluorine-based resin such as PTFE, polyvinylidene fluoride, and the like. For the form of the sidewall (membrane) of the hollow fiber, any one of; a porous membrane, a micro porous membrane, or a homogeneous membrane (nonporous membrane) not having porosity can be used. As the membrane structure, either one of; a symmetric membrane (homogeneous membrane) where a chemical or physical structure of the overall membrane is homogeneous, or an asymmetric membrane (nonuniform membrane) where the chemical or physical structure of the membrane differs depending on the part of the membrane, can be used. The asymmetric membrane is a so called nonuniform membrane being a compact layer of a nonporous membrane and a membrane having porosity. The compact layer may be a surface portion of the membrane, or a portion inside the porous membrane, and it does not matter where the compact layer is formed within the membrane. This nonuniform membrane also includes a so called composite membrane in which the chemical structures are different, and a multi-layered structure membrane such as a three layer structure. In particular, since the nonuniform membrane that uses the poly (4-methylpentene-1) resin has a compact layer that blocks liquid, then it is particularly desirable for deaerating liquid other than water, for example ink. Furthermore, in the case of a hollow fiber used for the external perfusion type, then preferably the compact layer is formed on the outside surface of the hollow fiber.

The conventional deaerating hollow fiber module, as indicated for example in the following Patent Documents 6, 7, and 8, has a cylindrical core, and a multiplicity of hollow fibers bundled around the core. The cylindrical core ensures the rigidity of the deaerating hollow fiber module, and functions as a base for holding the multiplicity of hollow fibers at the time of manufacturing the module. Furthermore, it also has a role as a liquid supply passage for controlling the flow of liquid, however it also becomes a cause of pressure loss.

Patent Document 1: Japanese Unexamined Patent Application, First Publication No. H05-17712
Patent Document 2: Japanese Unexamined Patent Application, First Publication No. H10-298470
Patent Document 3: Japanese Unexamined Patent Application, First Publication No. H02-107317
Patent Document 4: Japanese Unexamined Patent Application, First Publication No. H05-245347
Patent Document 5: Japanese Unexamined Patent Application, First Publication No. H05-245348
Patent Document 6: Japanese Unexamined Patent Application, First Publication No. S52-99978
Patent Document 7: Japanese Unexamined Patent Application, First Publication No. 2002-361050
Patent Document 8: Japanese Unexamined Patent Application, First Publication No. 2005-305432

DISCLOSURE OF INVENTION

Problems to be Solved by the Invention

In relation to the above deaerating and defoaming in an ink jet printer, particularly in an industrial printer, a deaerating hollow fiber module mounted inside the printer is used, and it is required that deaerating is performed during print processing. In this case, for the deaerating hollow fiber module, one which is as small as possible and for which pressure loss is minimal is necessary. Also in the deaerating hollow fiber module there is a trend towards requiring miniaturization. However, since the above described cylindrical core has a function of ensuring the rigidity of the deaerating hollow fiber module, and as a support base for the hollow fiber, the pressure loss that occurs when ink is introduced and a deaerating and defoaming process is performed, becomes a significant problem.

The present invention takes into consideration the above circumstances, with an object of providing a process for manufacturing a deaerating hollow fiber module that manufactures a deaerating hollow fiber module simply and with high accuracy, and that meets the requirements for a significant reduction in pressure losses, and miniaturization.

Means for Solving the Problem

The process for manufacturing a deaerating hollow fiber module of the present invention includes the steps of; wrapping a sheet containing a multiplicity of hollow fibers around a temporary core so that the total area of the membrane of the multiplicity of hollow fibers is within a range from $0.01\ m^2$ to $0.5\ m^2$; retaining in tubular form the sheet wrapped around the temporary core; covering a cylindrical housing over said sheet retained in tubular form; and removing the temporary core from the sheets covered with the housing, while retaining the sheet in a tubular form, wherein a deaerating hollow fiber module is formed through said steps such that a filling factor of said multiplicity of hollow fibers in said housing interior is from 5% to 50%.

Effects of the Invention

According to the process for manufacturing a deaerating hollow fiber module of the present invention, a sheet containing a multiplicity of hollow fibers is wrapped around the temporary core and retained in a tubular form, and the cylindrical housing is covered on the sheet retained in a tubular form. After that, the temporary core is removed from the sheet covered with the housing. As a result, by not having the core for ensuring rigidity and serving as a support base for the hollow fibers, requirements for miniaturization can be satisfied, and also a hollow fiber module for which the pressure loss which occurs at the time of flowing of the product to be processed, is minimized, can be manufactured easily and with high accuracy.

DESCRIPTION OF THE REFERENCE SYMBOLS

Figure 1:
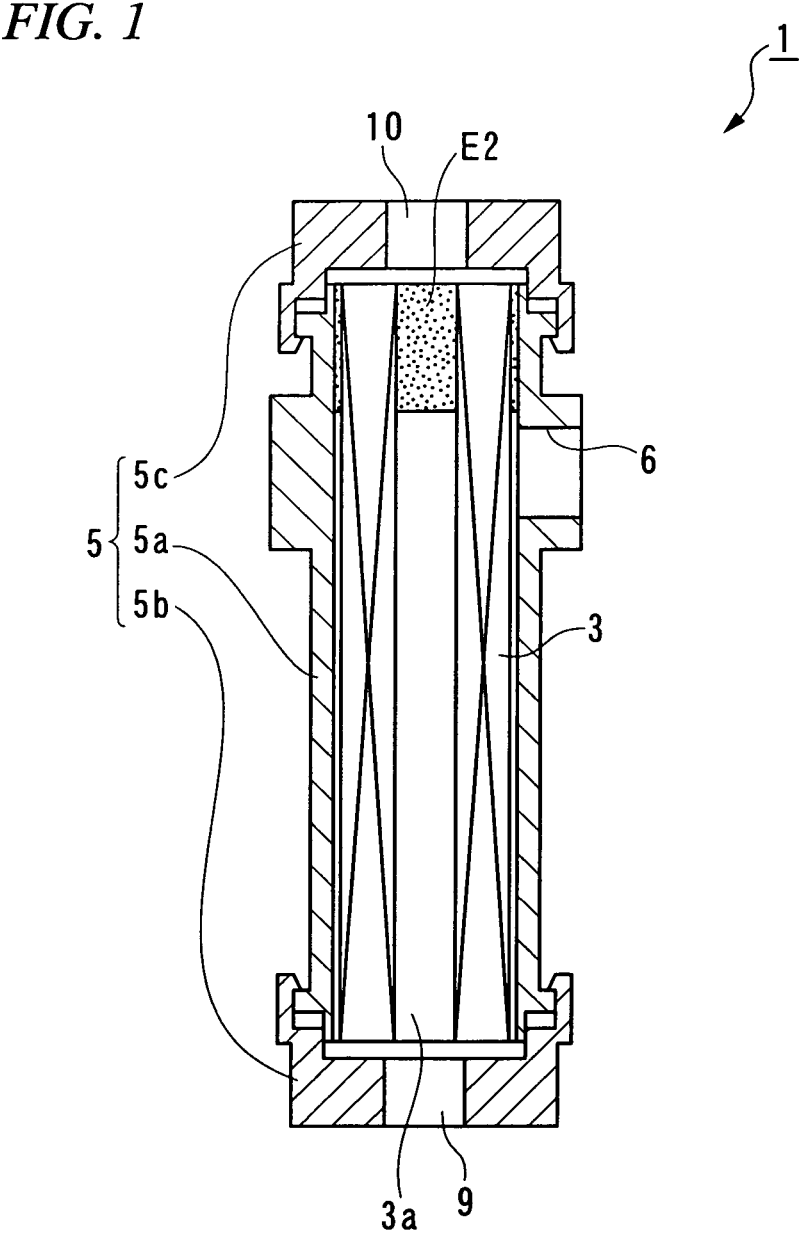
FIG. 1 is a drawing showing an embodiment of a process for manufacturing a deaerating hollow fiber module of the present invention, being a cross-sectional view of the deaerating hollow fiber module manufactured by the present invention.

1 Hollow fiber module
2 Hollow fiber
2a Hole
2b Warp
3 Fiber bundle
3a Central hole
4 Hollow fiber sheet
5 Housing
5a Housing main body
5a, 5b Cap
5d Header
6 Ink outlet
7 Circular flange
8 Catch
9 Ink inlet
10 Suction port
11 Resin pipe
12 Tacking sheet
13 Stationary jig
14 Shaft
15 Centrifugal sealing jig
E1, E2, U Sealing resin

BEST MODE FOR CARRYING OUT THE INVENTION

Embodiments of the process for manufacturing a deaerating hollow fiber module of the present invention will be described.

The process for manufacturing a deaerating hollow fiber module of the present invention, comprises a step of wrapping a sheet containing a multiplicity of hollow fibers around a temporary core and retaining in a tubular form, supplying a resin to the one end of the sheet that is retained in tubular form, bonding the one end of the multiplicity of hollow fibers lined up on the one end of the sheet to each other, and sealing holes of the respective hollow fibers that are open to the one end of the sheet. Before curing of the resin, the housing may be covered over the sheet, and after curing of the resin, the temporary core may be removed from the sheet. The sheet containing the multiplicity of hollow fibers may be a sheet in which the hollow fibers are woven in a mesh form. However in the case where a liquid such as ink flows, the liquid can contact uniformly with all of the hollow fibers, so that a defoaming process can be efficiently performed. Therefore it is preferable to have a sheet where all of the multiplicity of hollow fibers are arranged substantially parallel.

According to the process for manufacturing a deaerating hollow fiber module of the present invention, before removing the temporary core from the sheet that is retained in a tubular form, the resin is supplied to the one end of the tubular form sheet, and the one end of the multiplicity of hollow fibers lined up on the one end of the sheet are bonded to each other, and the holes of the respective hollow fibers that open to the one end of the sheet are sealed. As a result, in the case where all of the multiplicity of hollow fibers are arranged substantially parallel, it is possible to form a central hole parallel with the longitudinal direction of the hollow fibers in the tubular form sheet. Regarding the central hole of the sheet, in the conventional deaerating hollow fiber module, it is ensured by the core serving as the support base. However, in the deaerating hollow fiber module accordingly to the present invention, even if the core is not provided, the central hole can be easily ensured.

In the process for manufacturing a deaerating hollow fiber module of the present invention, there may be provided a step for supplying resin to the other end of the sheet from which the temporary core has been removed, bonding the other ends of the multiplicity of hollow fibers lined up on the other end of the sheet to each other, and filling the resin into a hole that opens to the other end of the sheet.

According to the present invention, after removing the temporary core from the sheet retained in the tubular form, resin may be supplied to the other end of the tubular form sheet, and the other ends of the multiplicity of hollow fibers lined up on the other end of the sheet may be bonded to each other, and resin may be filled into the other end of the hole (the abovementioned central hole) that opens to the other end of the sheet. Regarding the other end of the central hole of the sheet, in the conventional deaerating hollow fiber module, it is closed by the core serving as the support base. However in the deaerating hollow fiber module according to the present invention, even if the core is not provided, the other end of the central hole can be easily closed.

Embodiments

An embodiment of a process for manufacturing a deaerating hollow fiber module of the present invention is described with reference to the drawings.

Figure 2:
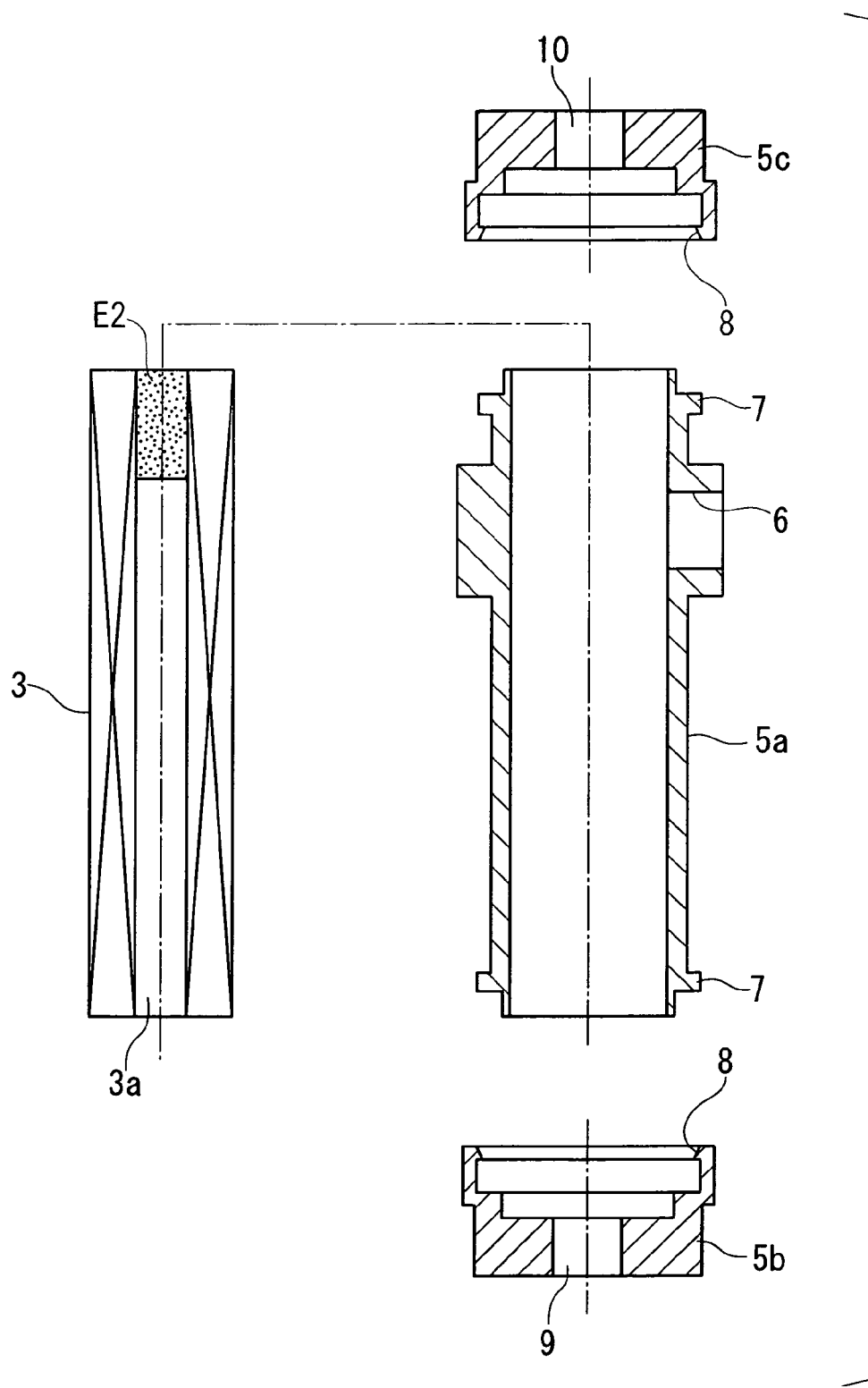
FIG. 2 is an exploded sectional view of the deaerating hollow fiber module shown in FIG. 1.
Figure 5:
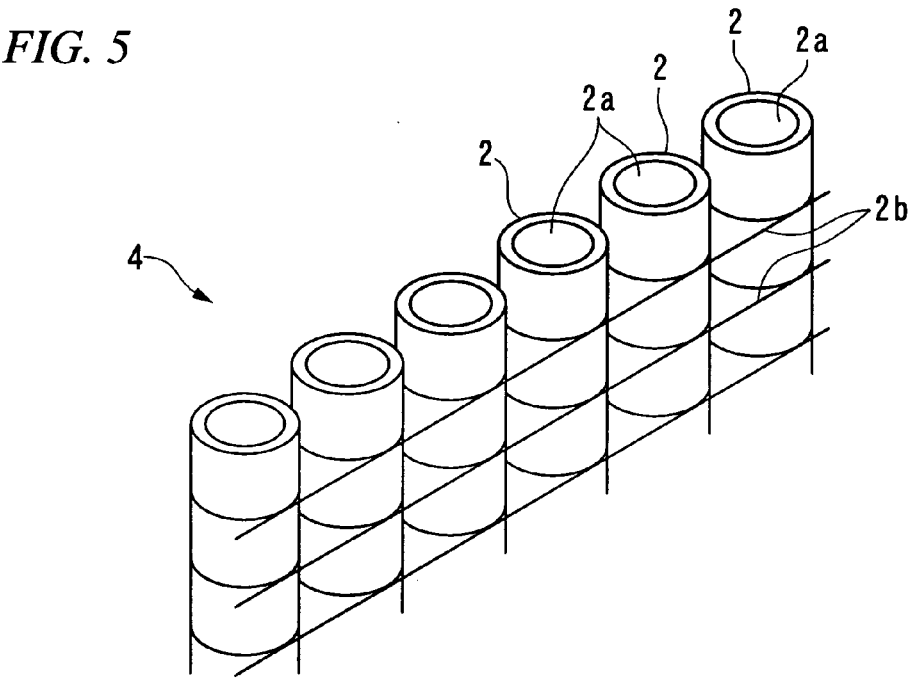
FIG. 5 is an enlarged perspective view of a hollow fiber sheet which is the basis for the fiber bundle shown in FIG. 1.

At first, FIG. 1 and FIG. 2 show a configuration of a deaerating hollow fiber module which does not have a cylindrical core. This no-core deaerating hollow fiber module 1 comprises at bundle 3 of a multiplicity of hollow fibers, and a housing 5 that accommodates the fiber bundle 3. The fiber bundle 3, as shown in FIG. 5, is one in which a sheet 4 with a multiplicity of hollow fibers 2 lined up in the same direction and laced up with a warp 2b, is rolled up in a tubular form centered on an axis parallel with the lengthwise direction of the multiplicity of hollow fibers 2. At the centre of the cross-section orthogonal to the lengthwise direction of the fiber bundle 3, there is a provided a central hole 3a parallel with the lengthwise direction of the hollow fibers 2.

Figure 3:
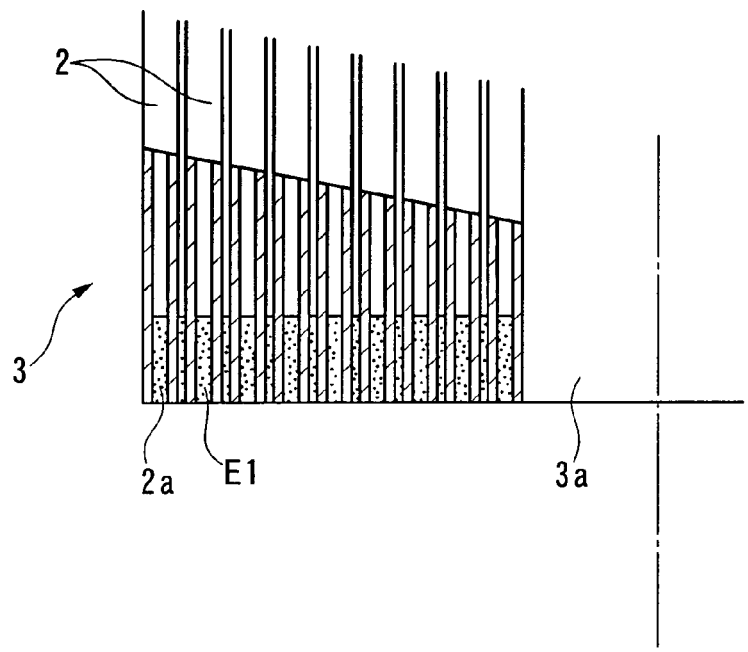
FIG. 3 is an enlarged sectional view of a bottom end of a fiber bundle shown in FIG. 1.

As shown in FIG. 3, the one ends of the hollow fibers 2 lined up on the one end (the bottom end) of the fiber bundle 3, are bonded to each other by a sealing resin E1 (for example epoxy resin, urethane resin, ultraviolet curing resin, and the like). The sealing resin E1 is also filled in the holes 2a of the respective hollow fibers 2 that open to the one end of the fiber bundle 3, and the respective holes 2a are blocked by the sealing resin E1 filled therein. However, the sealing resin E1 is not filled into the opening on the one end side of the central hole 3a.

Figure 4:
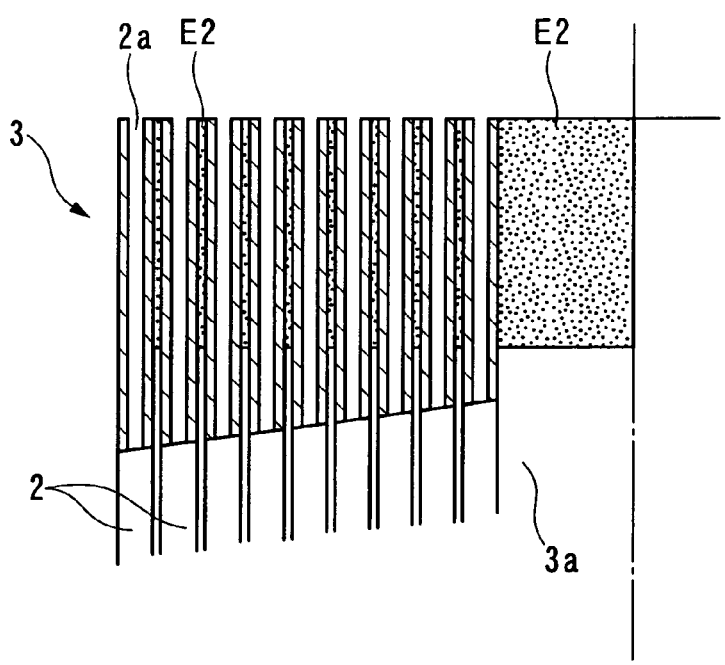
FIG. 4 is an enlarged sectional view of a top end of the fiber bundle shown in FIG. 1.

As shown in FIG. 4, the other ends of the hollow fibers 2 lined up on the other end (top end) of the fiber bundle 3, are bonded to each other by a sealing resin E2 (for example epoxy resin, urethane resin, ultraviolet curing resin, and the like). The sealing resin E2 is not filled into the holes 2a of the respective hollow fibers 2 that open to the other end of the fiber bundle 3, so that the holes 2a are open. However, the sealing resin E2 is filled into the central hole 3a, so that the opening on the other end side of the central hole 3a is sealed by the sealing resin E2 filled therein. That is, the central hole 3a is only open on the one end of the fiber bundle 3, and is closed on the other end of the fiber bundle 3.

As shown in FIG. 1 and FIG. 2, the housing 5 comprises a cylindrical housing main body 5a, a first cap 5b that is fitted to the one end (the bottom end) of the housing main body 5a, and a second cap 5c that is adhered to the other end (top end) of the housing main body 5a. In the housing main body 5a there is formed an ink outlet 6 facing in a direction orthogonal to the lengthwise direction of the housing main body 5a.

On the outer peripheral face of one end of the housing main body 5a there is formed around the circumferential direction, a circular flange 7 for fixing the first cap 5b. Meanwhile, on the first cap 5b there is formed a catch 8 that is latched with the circular flange 7 when the cap 5b is fitted to the one end of the housing main body 5a. The catch 8 is latched to the circular flange 7 to thereby fix the first cap 5b to the one end of the housing main body 5a. An adhesive may be supplementarily filled between the first cap 5b and the one end of the housing main body 5a.

Also on the outer peripheral face of the other end of the housing main body 5a there is formed around the circumferential direction, a circular flange 7 for fixing the second cap 5c. Meanwhile, on the second cap 5c also there is formed a catch 8 that is latched with the circular flange 7 when the cap 5c is fitted to the other end of the housing main body 5a. The catch 8 is latched to the circular flange 7, to thereby fix the second cap 5c to the other end of the housing main body 5a. Here also an adhesive may be supplementarily filled between the second cap 5c and the other end of the housing main body 5a.

In order to increase the fixing strengths of the housing main body 5a, and the first and second caps 5b and 5c, instead of the latching configuration between the catch 8 and the circular flange 7, a screw configuration between a male thread and female thread may be adopted.

In the centre of the first cap 5b there is formed in the lengthwise direction of the housing main body 5a, an inlet 9 for introducing ink (containing bubbles) to the deaerating hollow fiber module 1, and in the centre of the second cap 5c there is formed in the lengthwise direction of the housing main body 5a, a suction port 10 for evacuating the deaerating hollow fiber module 1.

Figure 6:
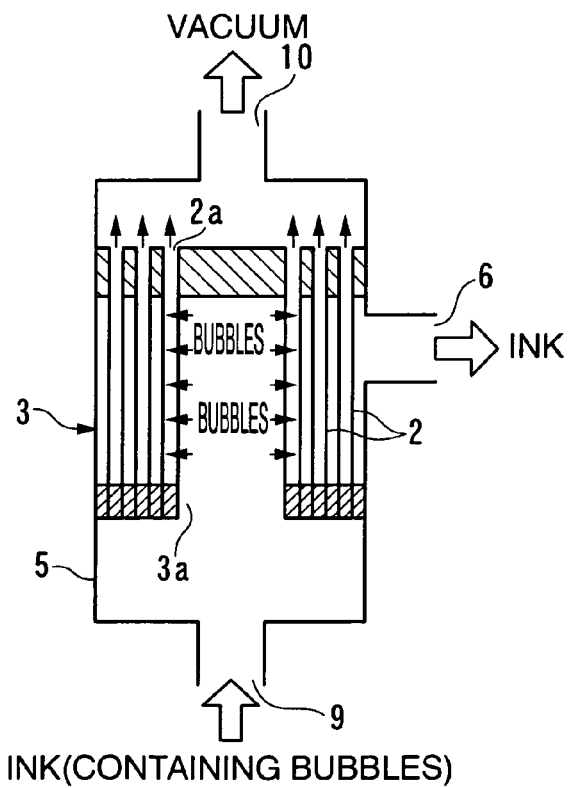
FIG. 6 is a schematic diagram for explaining the behavior of the deaerating hollow fiber module shown in FIG. 1.

To describe briefly the defoaming due to the deaerating hollow fiber module 1, as shown in FIG. 6, ink containing bubbles is introduced to inside the housing 5 through the inlet 9. The ink introduced to inside the housing 5, is supplied to the fiber bundle 3 through the central hole 3a, and while making contact with the outside of the respective hollow fibers, is discharged to outside of the housing 5 through the ink outlet 6. While continuing introduction of ink to inside the housing 5, if the interior of the housing 5 is evacuated through the suction port 10, the inside of the respective hollow fibers 2 is reduced in pressure through the holes 2a of the respective hollow fibers 2 that open to the other end of the fiber bundle 3. When the inside of the respective hollow fibers 2 is reduced in pressure, the ink or the gas contained in the ink, tends to move to the inside of the hollow fibers with low partial pressure. However, due to the presence of the hollow fibers, the ink itself does not move to the inside of the hollow fibers, and hence only the gas moves to the inside of the hollow fibers, so that the gas is removed from the ink. The role of the inlet port 9 and the outlet 6 may be reversed, and has no influence on the removal performance.

Next the process for manufacturing the deaerating hollow fiber module 1 manufactured as described above, is specifically described with reference to FIG. 7 through FIG. 15.
(Cutting of the Hollow Fiber Module)

Hollow fibers 2 with an inner diameter of 100 µm and an outer diameter of 180 µm and having a sidewall (membrane) of a heterogeneous structure with poly-4-methylpentane-1 as the raw material, are prepared, and a hollow fiber sheet 4 (refer to FIG. 5 and FIG. 7) with a multiplicity of the hollow fibers 2 lined up in the same direction and laced up with a warp 2b, is cut to an appropriate size. The width of the hollow fiber sheet 4 (the dimension in the direction of the hollow fibers 2) is slightly longer than a multiple of the length of the housing main body 5a that houses the fiber bundle 3, and the length of the hollow fiber sheet 4 (the dimension in the warp 2b direction), is such that when the cut hollow fiber sheet 4 is wrapped around the temporary core as explained later, while drawing out with a moderate tensile force, the diameter of the original roll is slightly smaller than the inside diameter of the housing main body 5a. In the present embodiment, the original roll is cut into two, and unit rolls are obtained. Therefore the width of the hollow fiber sheet 4 is slightly longer than two times the length of the housing main body 5a. However if the manufacture of the original roll is omitted, and at first a unit roll is manufactured, the width of the hollow fiber sheet 4 may be slightly longer than the housing main body 5a. In this case, the step for cutting of the original roll as described later is also omitted.
(Wrapping of the Hollow Fiber Sheet)

Figure 7:
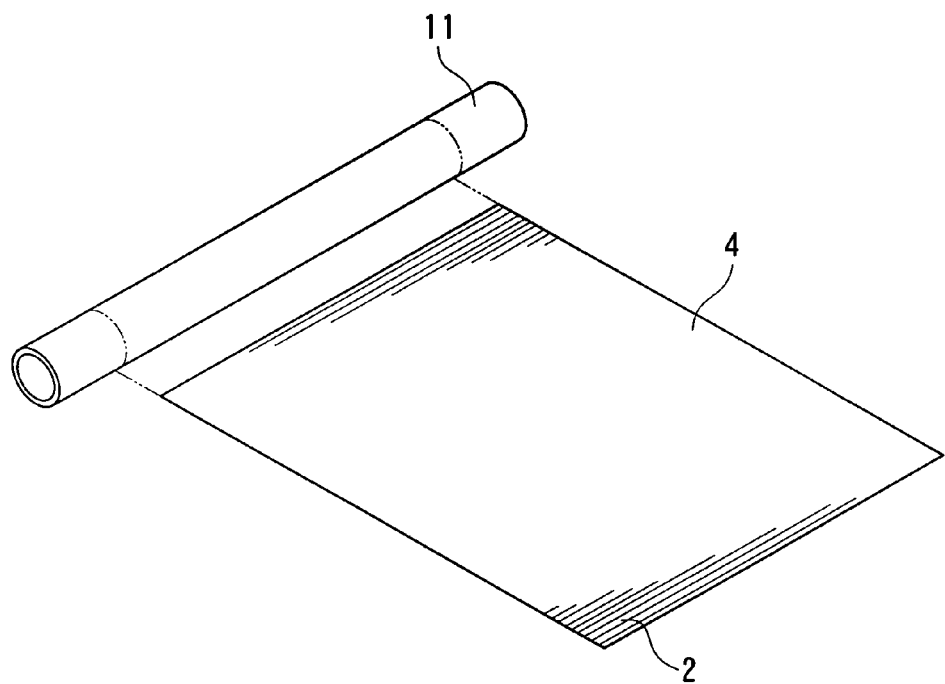
FIG. 7 is a diagram showing an embodiment of a process for manufacturing a deaerating hollow fiber module of the present invention, being a perspective view for explaining a step of wrapping the hollow fiber sheet around a resin tube.

A resin pipe (temporary core) 11 longer than the width of the hollow fiber sheet 4 is prepared. Then, as shown in FIG. 7, the lengthwise direction of the resin pipe 11, and the widthwise direction of the hollow fiber sheet 4, are made to coincide with both ends of the resin pipe 11 slightly protruding, and while pulling the hollow fiber sheet 4 with a moderate tension, the sheet is wrapped around the resin pipe 11. The effective membrane area of the fiber bundle 3 inside the housing main body 5a (the total area of the surface of the hollow fibers 2 in contact with the liquid) may be within a range from 0.01 $m^2$ to 0.5 $m^2$. Furthermore, the filling rate (a value for where the sum total of the cross sectional area of the respective hollow fibers 2, divided by the difference between the cross-sectional area of the housing main body 5a and the area of the central hole 3a, is represented as a percentage) may be within a range from 5% to 50%, and particularly within a range from 10% to 40%, and more particularly within from 20% to 30%.
(Tacking of the Hollow Fiber Sheet)

Figure 8:
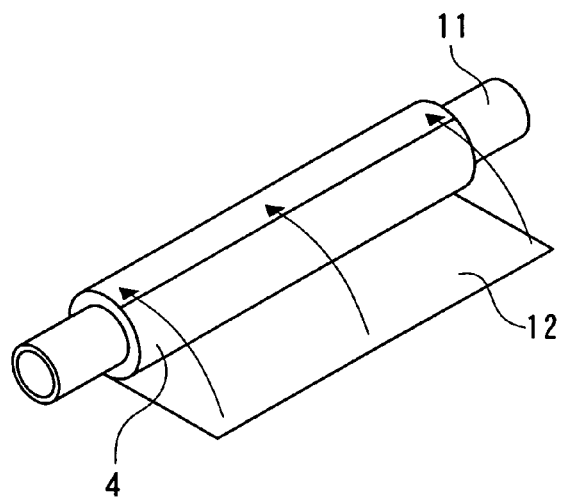
FIG. 8 is a diagram showing an embodiment of a process for manufacturing a deaerating hollow fiber module of the present invention, being a perspective view for explaining a step of tacking the hollow fiber module with a tacking sheet.

A tacking sheet 12 made from a thin resin is prepared. Then, as shown in FIG. 8, the tacking sheet 12 is wrapped in close contact so as to have no play, on the outer periphery of the hollow fiber sheet 4 which is wrapped around the resin pipe 11. Once the tacking sheet 12 is wrapped once around the outer periphery of the hollow fiber sheet 4, the trailing end of the tacking sheet 12 is bonded to the tacking sheet 12 itself, such that the hollow fiber sheet 4 is not separated from the resin pipe 11. After that, it is placed in a predetermined temperature environment and left for a predetermined time.
(Cutting of the Original Roll)

Figure 9:
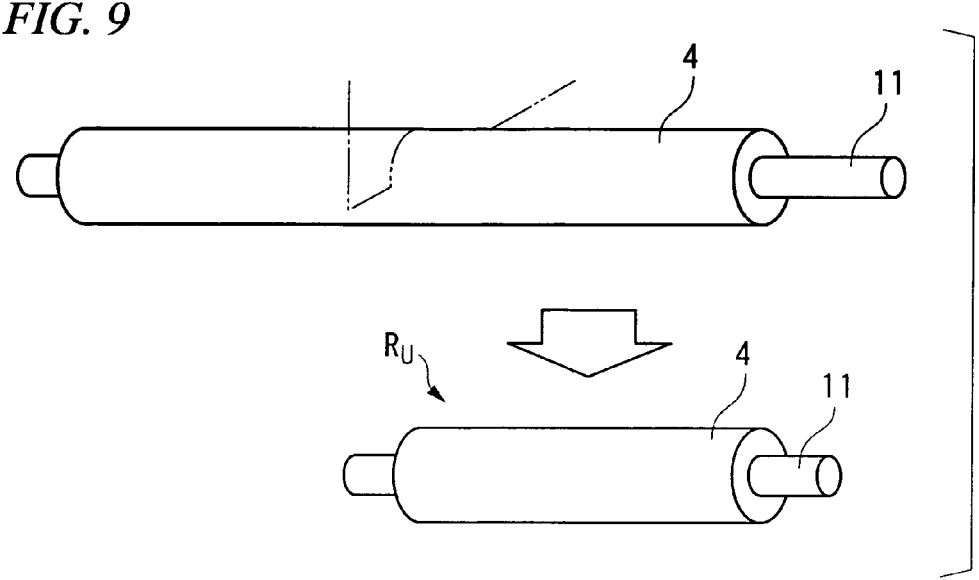
FIG. 9 is a diagram showing an embodiment of a deaerating hollow fiber module of the present invention, being a perspective view for explaining a step of cutting an original roll.

For the original roll with the hollow fiber sheet 4 wrapped on the resin pipe 11, as shown in FIG. 9, the resin pipe 11 is slightly displaced with respect to the hollow fiber sheet 4, and the hollow fiber sheet 4 is cut using a pipe cutter. At this time, the width of the hollow fiber sheet 4 is slightly longer than the housing main body 5a accommodating the fiber bundle 3. By repeating the above cutting operation, the original roll with the hollow fiber sheet 4 wrapped on the resin pipe 11, is cut into a plurality of unit rolls Ru. After that, for each of the unit rolls Ru that has been cut, the resin pipe 11 is displaced slightly with respect to the hollow fiber sheet 4, with both ends of the resin pipe 11 slightly protruding with respect to the hollow fiber sheet 4.
(Sealing of the One End of the Fiber Bundle)

Figure 10:
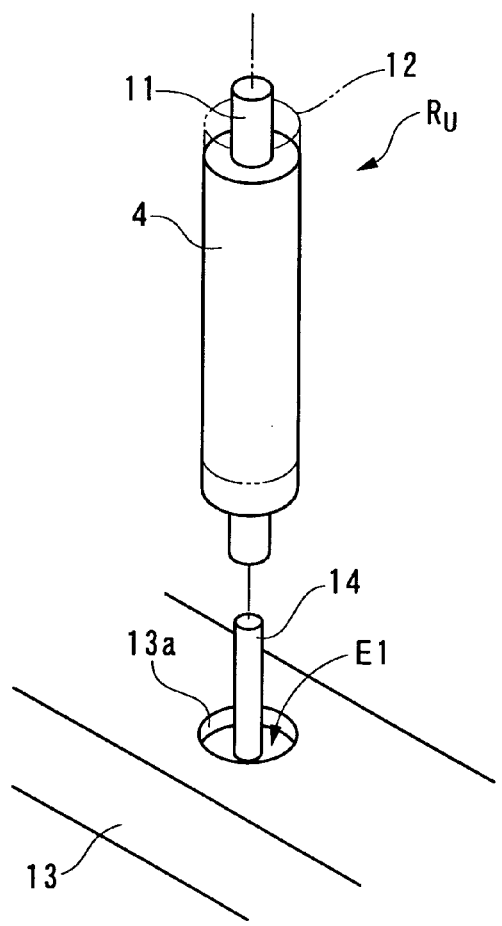
FIG. 10 is a diagram showing an embodiment of a process for manufacturing a deaerating hollow fiber module of the present invention, being a perspective view for explaining a step for stationary sealing of one end of the fiber bundle.

A mould release is spread on a stationary jig 13, and an uncured sealing resin E1 (for example urethane resin, epoxy resin, ultraviolet curing resin, or the like) is poured onto a recess 13a in the stationary jig 13. Next, as shown in FIG. 10, a shaft 14 standing upright on the stationary jig 13, is pushed into the hole of the resin pipe 11, so that the unit roll Ru is stood upright on the stationary jig 13. The sealing resin E1 is supplied to the one end of the unit roll Ru standing upright on the stationary jig 13. At this time, so that the sealing resin E1 did not adhere to the tacking sheet 12, the tacking sheet 12 is pulled upwards with respect to the hollow fiber sheet 4.

Figure 11:
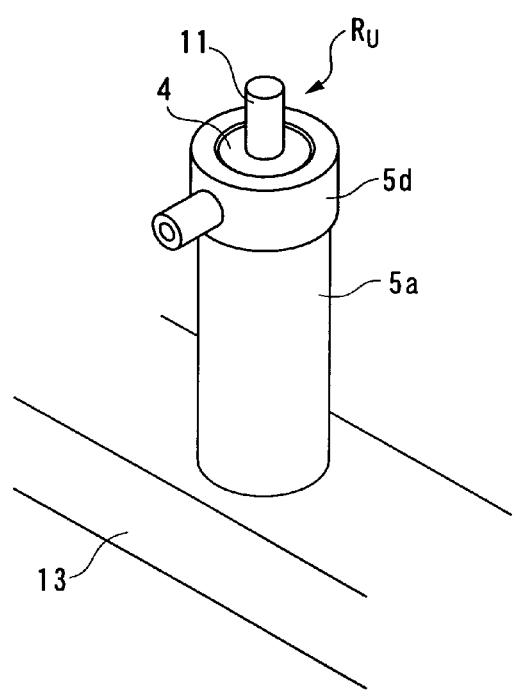
FIG. 11 is a perspective view for explaining a step for stationary sealing of one end of the fiber bundle, similar to FIG. 10.

As shown in FIG. 11, after covering the housing main body 5a over the unit roll Ru standing up on the stationary jig 13, the tacking sheet 12 is removed from the unit roll Ru and left for a predetermined time. During this time, the sealing resin E1 cured, and the one ends of the multiplicity of hollow fibers 2 lined up on the one end of the fiber bundle 3 around the resin pipe 11, are bonded to each other, and the holes 2a of the respective hollow fibers 2 that open to the one end of the fiber bundle 3 are blocked (refer to FIG. 3). Furthermore, the one end of the fiber bundle 3 is bonded to the housing main body 5a. On the other end of the housing main body 5a there is integrally formed a header 5d for supplying sealing resin E2 to the other end of the fiber bundle 3 in a later described centrifugal sealing process. The header 5d is finally cut away from the housing main body 5a.
(Extraction of the Resin Pipe)

Figure 12:
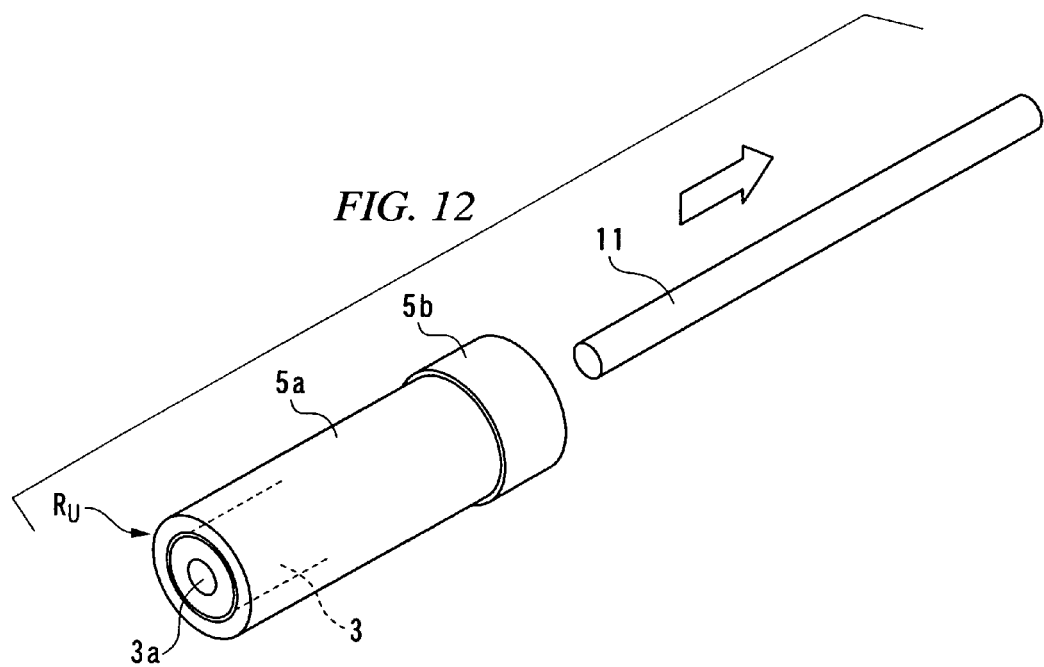
FIG. 12 is a diagram showing an embodiment of a process for manufacturing a deaerating hollow fiber module of the present invention, being a perspective view for explaining a step for extracting a resin tube from the unit roll.

After the sealing resin E1 has cured, as shown in FIG. 12, the unit roll Ru that is fixed to the inside of the housing main body 5a is removed from the stationary jig 13, and the resin pipe 11 is extracted from the unit roll Ru. When the resin pipe 11 is extracted, only the fiber bundle 3 remained inside of the housing main body 5a, and the central hole 3a is open.
(Sealing of the Other End of the Fiber Bundle)

Figure 13:
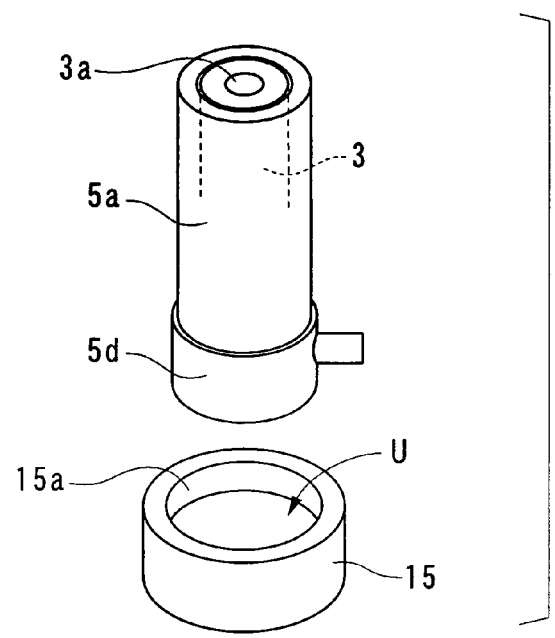
FIG. 13 is a diagram showing an embodiment of a process for manufacturing a deaerating hollow fiber module of the present invention, being a perspective view for explaining a step for centrifugal sealing of an other end of the fiber bundle.

A mould release is spread on a centrifugal sealing jig 15, and an uncured sealing resin U (for example urethane resin, epoxy resin, ultraviolet curing resin, or the like) is poured onto a recess 15a in the centrifugal sealing jig 15. Next, as shown in FIG. 13, the housing main body 5a accommodating the fiber bundle 3 is stood up on the centrifugal sealing jig 15 with the other end down. The sealing resin U is supplied to the other end of the fiber bundle 3 accommodated in the housing main body 5a standing upright on the centrifugal sealing jig 15. Thereafter, the housing main body 5a standing up on the centrifugal sealing jig 15 is left for a predetermined time.

Figure 14:
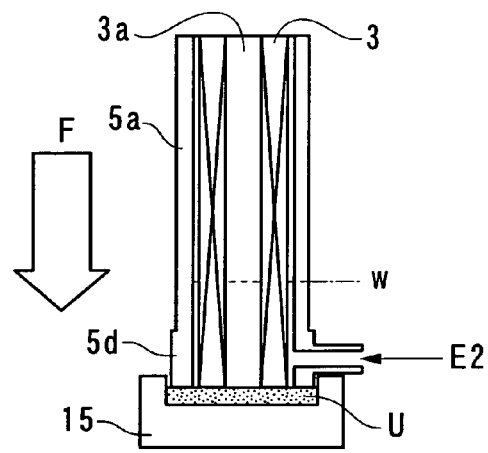
FIG. 14 is a perspective view for explaining a step for centrifugal sealing of the other end of the fiber bundle, similar to FIG. 13.

After the sealing resin U has cured, as shown in FIG. 14, the housing main body 5a that is bonded to the centrifugal sealing jig 15 is subjected to centrifuging by the centrifugal sealing device. In the centrifugal sealing device, while supplying sealing resin E2 (for example urethane resin, epoxy resin, ultraviolet curing resin, or the like) to the other end of the fiber bundle 3 via the header 5d formed on the housing main body 5a, a centrifugal force is applied for a predetermined time from the one end of the fiber bundle 3 towards the other end (in the direction of arrow F in the drawing). The sealing resin E2 filled up to the level of W in the drawing and cured, and the other ends of the multiplicity of hollow fibers 2 lined up on the other end of the fiber bundle 3 are bonded to each other, and the central hole 3a open to the other end of the fiber bundle 3 is sealed (refer to FIG. 4).

(Cutting of the Header 5d)

Figure 15:
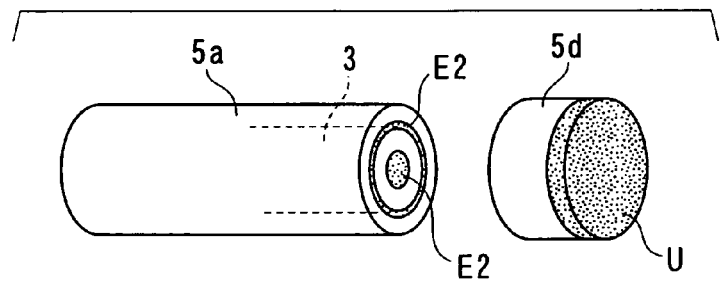
FIG. 15 is a diagram showing an embodiment of a process for manufacturing a deaerating hollow fiber module of the present invention, being a perspective view for explaining a step for cutting a header from the housing main body.

After the sealing resin E2 has cured, as shown in FIG. 15, the housing main body 5a accommodating the fiber bundle 3 is cut, and the header 5d, together with the centrifugal sealing jig 15 is cut from the housing main body 5a. When the header 5d is cut, the holes 2a in the other ends of the respective hollow fibers 2 are open to the other end of the fiber bundle 3 (a condition where the central hole is sealed by the sealing resin E2).

(Fitting of the Cap)

The first cap 5b is fitted to the one end of the housing main body 5a, and the second 5c is fitted to the other end. If necessary, an adhesive can be filled between the first and second caps 5b and 5c, and the housing main body 5a, to give reinforcement. By way of the above mentioned steps, the deaerating hollow fiber module 1 shown in FIG. 1 through FIG. 6 is completed.

In the above manner, according to the process for manufacturing a deaerating hollow fiber module of the present embodiment, the sheet 4 containing the multiplicity of hollow fibers 2 is wrapped on the resin pipe 11 serving as a temporary core, and retained in a tubular form. After that, the resin pipe 11 is removed from the hollow fiber sheet 4 which is retained in the tubular form. As a result, a module with just the hollow fiber 2 with a minimal pressure drop produced when the ink flows, can be produced without having a core for ensuring rigidity, and serving as a support base for the hollow fibers.

Furthermore, in the process for manufacturing a deaerating hollow fiber module of the present embodiment, before removing the resin pipe 11 from the hollow fiber sheet 4 which is retained in a tubular form, the sealing resin E1 is supplied to the one end of the hollow fiber sheet 4 of tubular form, and the one ends of the multiplicity of hollow fibers 2 lined up on the one end of the hollow fiber sheet 4 are bonded to each other, and the holes 2a of the respective hollow fibers 2 opening to the one end of the hollow fiber sheet 4 are sealed. As a result, it is possible to form the central hole 3a parallel with the lengthwise direction of the hollow fiber 2 in the hollow fiber sheet 4 of tubular form. Regarding the central hole 3a of the hollow fiber sheet 4, in the conventional deaerating hollow fiber module it is ensured by the core serving as the support base. However, even in the deaerating hollow fiber module 1 of the present embodiment which does not have a core, the central hole 3a can be easily ensured by the above described method.

In addition, in the process for manufacturing a deaerating hollow fiber module of the present embodiment, after removing the resin pipe 11 from the hollow fiber sheet 4 retained in tubular form, the sealing resin E2 is supplied to the other end of the hollow fiber sheet 4 of tubular form, and the other ends of the multiplicity of hollow fibers 2 lined up on the other end of the hollow fiber sheet 4 are bonded to each other, and the sealing resin E2 can be filled into the other end of the central hole 3a that opens to the other end of the hollow fiber sheet 4. Regarding the other end of the central hole 3a of the hollow fiber sheet 4, in the conventional deaerating hollow fiber module, it is closed by the core serving as the support base. However, even in the deaerating hollow fiber module 1 of the present embodiment which does not have a core, the other end of the central hole 3a can be easily closed.

In the above embodiment, the one end of the fiber bundle 3 is statically sealed, and the other end is sealed centrifugally. However the method of sealing may be either static or centrifugal. For example, one end of the unit roll may be sealed centrifugally, and the other end may be sealed statically. Furthermore, both ends of the unit roll may be sealed statically, or both ends may be sealed centrifugally.

Next is a description of a modified example of the above embodiment.

Modified Example 1

Figure 16:
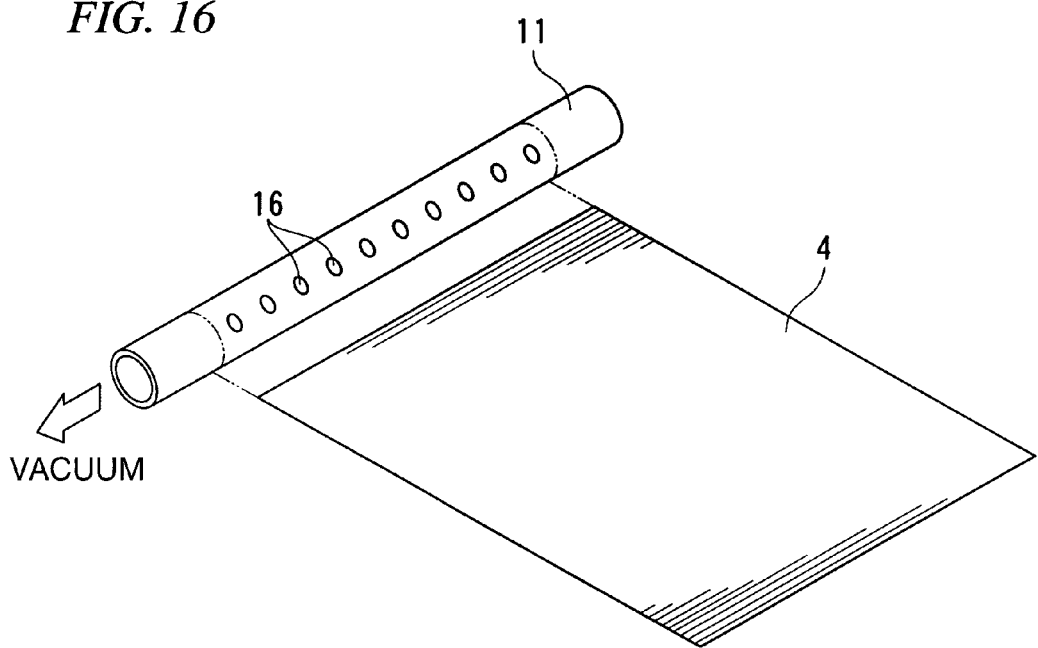
FIG. 16 is a diagram showing a modified example 1 of the process for manufacturing a deaerating hollow fiber module of the present invention, being a perspective view for explaining a step of wrapping the hollow fiber sheet around a resin pipe.

In a modified example 1, as shown in FIG. 16, a plurality of through holes 16 are formed in the wall of the resin pipe 11. Then, by evacuating the inside of the resin pipe 11, the starting end of the hollow fiber sheet 4 is sucked onto the resin pipe 11 through the through holes 16. As a result the hollow fiber sheet 4 can be easily wrapped around the resin pipe 11.

Modified example 2

Figure 17:
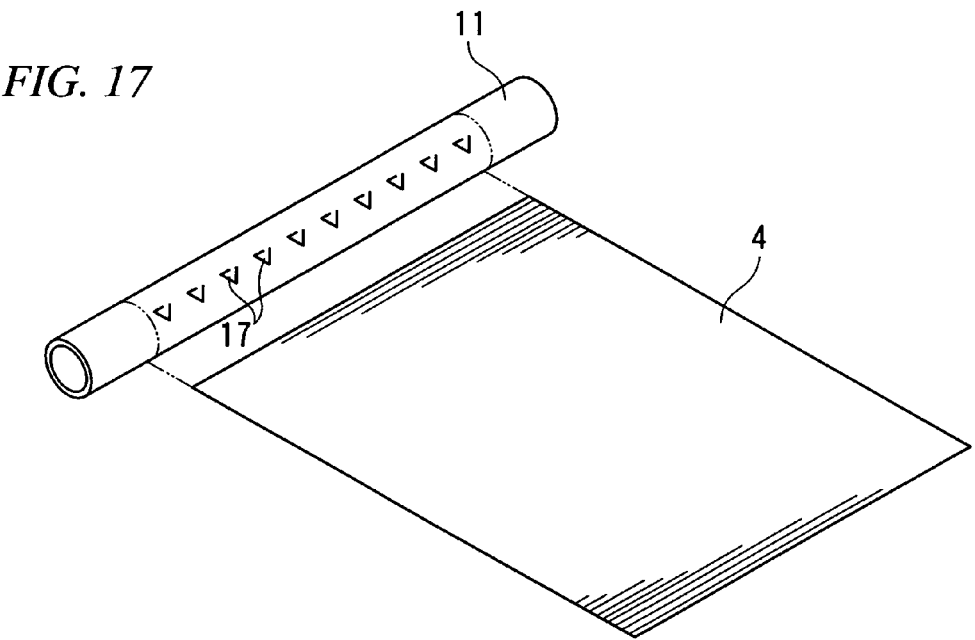
FIG. 17 is a diagram showing a modified example 2 of the process for manufacturing a deaerating hollow fiber module of the present invention, being a perspective use for explaining a step of wrapping the hollow fiber sheet around a resin pipe.

In a modified example 2, as shown in FIG. 17, a plurality of hooks 17 are formed facing in one direction in the circumferential direction on the outer peripheral face of the resin pipe 11. Then, the hollow fiber sheet 4 is caught on the hooks, and the resin pipe 11 is rotated in the direction of the hooks 17 so that the hollow fiber sheet 4 is wrapped around the resin pipe 11. After the sheet has been wrapped, the resin pipe 11 is rotated in the opposite direction so that the resin pipe 11 is gradually extracted from the hollow fiber sheet 4. As a result, the hollow fiber sheet 4 can be easily wrapped on the resin pipe 11. There may be a mechanism whereby the hooks 17 can be mechanically pushed in and out from the outer peripheral face of the resin pipe 11. When the hollow fiber sheet 4 is wrapped around the resin pipe 11, the hooks 17 protrude out from the outer peripheral face of the resin pipe 11, and catch on the hollow fiber sheet 4, and when the resin pipe 11 is extracted from the hollow fiber sheet 4, the hooks 17 are withdrawn to inside the resin pipe 11, so that the resin pipe 11 is removed without the hooks 17 interfering with the hollow fiber sheet 4. Therefore the hollow fiber sheet 4 does not suffer any damage.

A preferred embodiment of the present invention has been described above, however the present invention is not limited to the above embodiment. Additions, omissions, and substitutions of the configuration, and other modifications are possible without departing from the gist of the present invention.

INDUSTRIAL APPLICABILITY

The present invention is a process for manufacturing a deaerating hollow fiber module with no core, and relates to a process for manufacturing a deaerating hollow fiber module comprising the steps of; wrapping a sheet containing a multiplicity of hollow fibers around a temporary core, retaining in tubular form the sheet wrapped around the temporary core; and removing the temporary core from the sheet retained in tubular form. According to the process for manufacturing a deaerating hollow fiber module of the present invention, by not having a core for ensuring rigidity and serving as a support base of the hollow fibers, requirements or miniaturization can be satisfied, and also a hollow fiber module for which the pressure loss which occurs at the time of flowing of the product to be processed, is minimized, can be manufactured easily and with high accuracy.

The invention claimed is:

1. A process for manufacturing a deaerating hollow fiber module comprising the steps of;
   wrapping a sheet containing a multiplicity of hollow fibers around a temporary core so that a total area of a membrane of said multiplicity of hollow fibers is within a range from 0.01 m$^2$ to 0.5 m$^2$;
   retaining in tubular form said sheet wrapped around said temporary core;
   supplying a resin to one end of said sheet that is retained in tubular form, bonding the one end of said multiplicity of hollow fibers lined up on the one end of said sheet to each other, and sealing holes of the respective hollow fibers that are open to the one end of said sheet,
   covering a cylindrical housing over said sheet retained in tubular form before curing of said resin; and
   removing said temporary core from said sheet covered with said housing after curing of said resin, while retaining said sheet in a tubular form,
   wherein a deaerating hollow fiber module is formed through said steps such that a filling factor of said multiplicity of hollow fibers in said housing interior is from 5% to 50%.

2. The process for manufacturing a deaerating hollow fiber module according to claim 1, comprising a step for supplying resin to the other end of the sheet from which said temporary core has been removed, bonding the other ends of said multiplicity of hollow fibers lined up on the other end of said sheet to each other, and filling said resin into a hole that opens to the other end of said sheet.

* * * * *